United States Patent
De Pasquale et al.

(10) Patent No.: US 8,208,929 B2
(45) Date of Patent: Jun. 26, 2012

(54) METHOD OF CELL ASSIGNMENT IN CELLULAR COMMUNICATIONS NETWORKS USING MACRODIVERSITY

(75) Inventors: Andrea De Pasquale, Madrid (ES); Javier López Roman, Madrid (ES); Julio Urbano Ruiz, Madrid (ES); Elisa Isabel Cervantes Cañavate, Alcobendas (ES)

(73) Assignee: Vodafone Group PLC, Newbury, Berkshire (GB)

( * ) Notice: Subject to any disclaimer, the term of this patent is extended or adjusted under 35 U.S.C. 154(b) by 280 days.

(21) Appl. No.: 12/625,995

(22) Filed: Nov. 25, 2009

(65) Prior Publication Data
US 2010/0234030 A1      Sep. 16, 2010

(30) Foreign Application Priority Data
Nov. 27, 2008   (ES) .................................. 200803387

(51) Int. Cl.
*H04W 36/00*     (2009.01)
(52) U.S. Cl. .................. 455/442; 455/422.1; 455/562.1; 455/561; 455/466; 455/522; 370/328; 370/259; 370/352; 375/267
(58) Field of Classification Search .................. 455/442, 455/422.1, 562, 561, 466, 522; 370/328, 370/259, 352; 375/267
See application file for complete search history.

(56) References Cited

U.S. PATENT DOCUMENTS

| | | | |
|---|---|---|---|
| 6,788,959 B2 * | 9/2004 | Jokinen et al. | 455/552.1 |
| 6,799,045 B1 * | 9/2004 | Brouwer | 455/453 |
| 7,418,273 B2 * | 8/2008 | Tomoe et al. | 455/561 |
| 2008/0057933 A1 * | 3/2008 | Brunner | 455/422.1 |

FOREIGN PATENT DOCUMENTS

WO   WO-2008/035884   3/2008

\* cited by examiner

*Primary Examiner* — Kamran Afshar
*Assistant Examiner* — Manpreet Matharu
(74) *Attorney, Agent, or Firm* — B. Aaron Schulman, Esq.; Stites & Harbison, PLLC.

(57) ABSTRACT

A method of selecting a cell from a certain active set of cells (102, 103) to become serving cell for a mobile terminal (101) instead of the primary cell (102) of said active set of cells (102, 103) during a call in a mobile communications network implementing soft handover, the method comprising the steps of: determining whether the radio access bearer (RAB) of said call is being served on a soft handover area or not, and: if said call is being served on a soft handover area, determining whether the user of said mobile terminal (101) can be considered static or in motion, and: if said user of said mobile terminal (101) is considered static, comparing the load of said primary cell (102) to the load of at least one of the remaining cells (103) within the active set (102, 103), and: if the load of said primary cell (102) exceeds the load of said at least one of said remaining cells (103) within the active set (102, 103) by a predetermined factor, transferring the downlink user plane from said primary cell (102) to said cell (103) of said remaining cells within the active set (102, 103), which is less loaded than said primary cell.

16 Claims, 2 Drawing Sheets

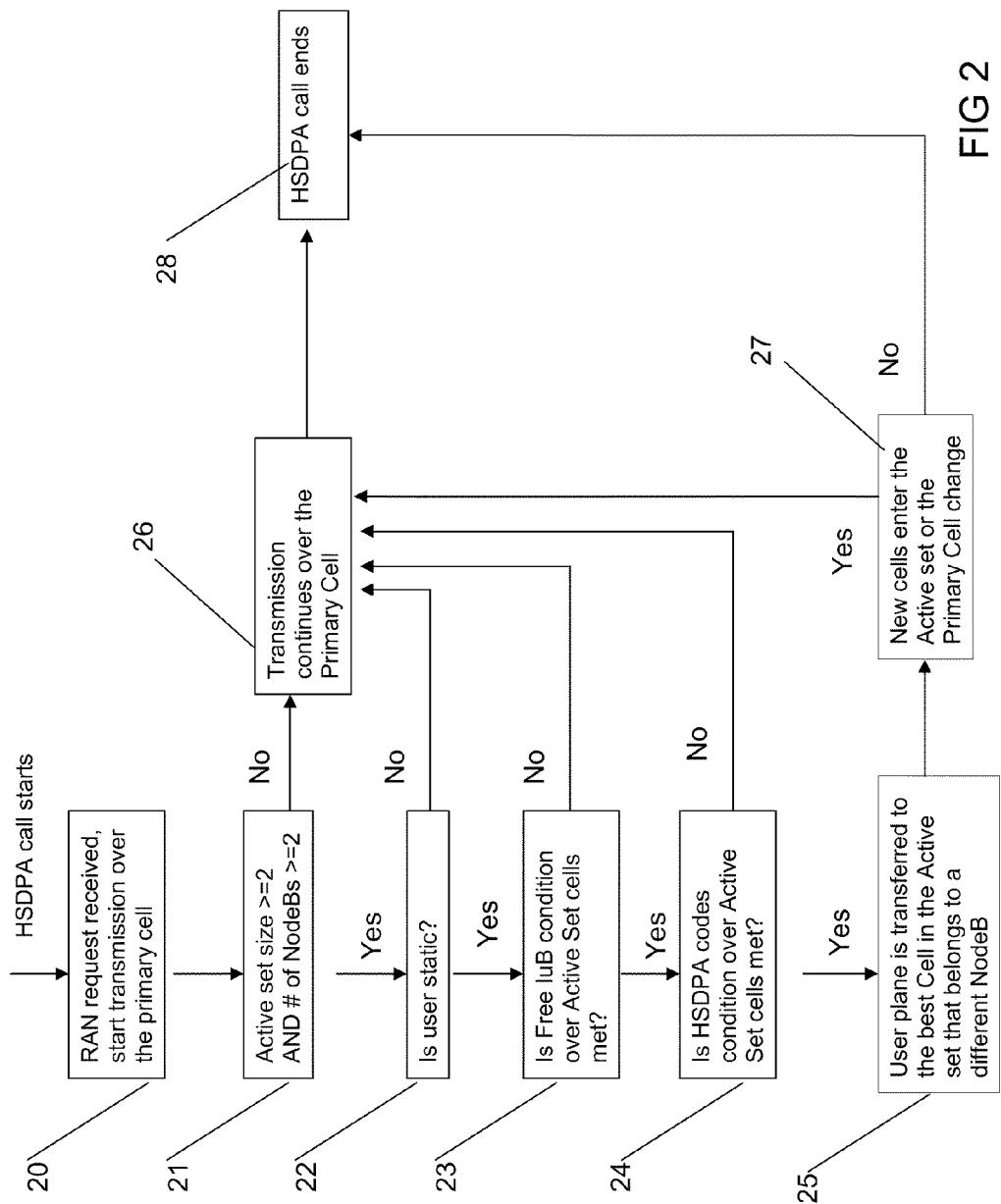

METHOD OF CELL ASSIGNMENT IN CELLULAR COMMUNICATIONS NETWORKS USING MACRODIVERSITY

FIELD OF THE INVENTION

The present invention relates to mobile or cellular telecommunications networks and in particular, to any cellular telecommunications network where soft handover might be implemented and where a cell having best radio conditions is selected to carry the user plane data.

STATE OF THE ART

Today, the most important data services are delivered using HSDPA (High-Speed Downlink Packet Access), due to its high achievable bit rates as well as low system latency. In a 3G Access network, there are several resources whose cost due to the operator increase as traffic grows; key factors responsible for such increase are, among others: (1) The amount of transmission resources needed in order to carry data between RNCs and NodeB, here called $I_{uB}$. The level of utilization of this resource can be expressed in terms of average Mbps. (2) The amount of processing power in the NodeB needed in order to process the data (modulation, demodulation, etc.), here called baseband resources. For a given and fixed amount of hardware (HW) dedicated to the HSDPA, the level of utilization can be expressed in terms of Number of HSDPA codes used.

In Soft Handover situations that involve HSDPA, the downlink (DL) physical control plane is transmitted by all the cells involved in the Soft Handover and combined in the mobile terminal, whilst the downlink (DL) user plane is transmitted by one cell only towards the mobile terminal and user: that cell being the cell with the best radio condition (i.e. with the highest Ec/I0—that is to say, radio conditions—measured by the user equipment (UE)); such serving cell is called the primary cell; the usage of the primary cells aims to guarantee the best radio conditions to the user, which in turn aims to guarantee the maximum throughput to the user in all scenarios, including those involving mobility.

It has been observed that, when dealing with high data rates, most users prefer to be static, i.e. their mobility whilst downloading significant volumes of data (and having assigned an HSDPA channel) is quite low. A typical example is the one of business users downloading presentations whilst in a meeting room, airline lounge, at home, or non-business users using peer to peer applications.

If a static HSDPA user happens to be in a soft handover area between 2 (or more) different NodeBs, the data may be transmitted by a NodeB whose $I_{uB}$ and/or baseband resources are quite loaded, whilst the other NodeBs can instead be lightly loaded as far as baseband or $I_{uB}$ are concerned. This happens because in current implementations the primary cell is selected on the basis of radio conditions only (Ec/Io). As a consequence, the user throughput could be limited due to the lack of $I_{uB}$ and/or baseband resources despite having neighbouring cells having available IuB and/or baseband resources to offer higher throughput.

Therefore, there is a need to optimize HSDPA resources in situations of soft handover involving static users.

SUMMARY OF THE INVENTION

The present invention is intended to address the above mentioned need.

In a first aspect of the present invention there is provided a method of selecting a cell from a certain active set of cells to become serving cell for a mobile terminal instead of the primary cell of said active set of cells during a call in a mobile communications network implementing soft handover, the method comprising the steps of: determining whether the radio access bearer (RAB) of said call is being served on a soft handover area or not, and: if said call is being served on a soft handover area, determining whether the user of said mobile terminal can be considered static or in motion, and: if said user of said mobile terminal is considered static, comparing the load of said primary cell to the load of at least one of the remaining cells within the active set, and: if the load of said primary cell exceeds the load of said at least one of said remaining cells within the active set by a predetermined factor, transferring the downlink user plane from said primary cell to said cell of said remaining cells within the active set, which is less loaded than said primary cell.

Preferably, when determining whether the radio access bearer (RAB) of said call is being served on a soft handover area or not, if said call is not being served on a soft handover area, continuing transmission of said call over said primary cell; when determining whether the user of said mobile terminal can be considered static or in motion, if said user of said mobile terminal is considered in motion, continuing transmission of said call over said primary cell; and, when comparing the load of the primary cell to the loads of each of the remaining cells within the active set, if the load in said primary cell does not exceed the load in at least one of said remaining cells within the active set by a predetermined factor, continuing transmission of said call over said primary cell.

The step of determining whether the radio access bearer (RAB) of said call is being served on a soft handover area or not, is preferably done as follows: counting the number of cells forming said active set; if said active set is formed by more than one cell, checking whether said cells forming the active set belong to at least two different nodeBs; and if said cells forming the active set belong to at least two different nodeBs, it is determined that the radio access bearer (RAB) of said call is being served on a soft handover area. When checking whether said cells forming the active set belong to at least two different nodeBs, if said cells forming the active set belong to a same nodeB, transmission of said call is continued over said primary cell belonging to that nodeB.

The step of determining whether the user of said mobile terminal can be considered static or in motion, can be done as follows: checking whether the cells forming the active set are the same for a certain period of time; and if the cells forming the active set vary during said period of time, the user of said mobile terminal is considered in motion; if the cells forming the active set are the same for said period of time, the user of said mobile terminal is considered static.

Alternatively, the step of determining whether the user of said mobile terminal can be considered static or in motion, is done as follows: checking whether the cell acting as primary cell does not change for a certain period of time; and if the cell acting as primary cell changes during said period of time, the user of said mobile terminal is considered in motion; if the cell acting as primary cell does not change during said period of time, the user of said mobile terminal is considered static.

Alternatively, the step of determining whether the user of said mobile terminal can be considered static or in motion, is done as follows: checking whether the cells forming the active set do not change over a certain period of time; and if the cells forming the active set vary at some point in time during the call, the user of said mobile terminal is considered in motion; if the cells forming the active set are the same for said period of time, checking whether the cell acting as primary cell does not change; and if the cell acting as primary cell changes at some point in time during the call, the user of said mobile terminal is considered in motion; if the cell acting as primary cell does not change at some point in time during the call, the user of said mobile terminal is considered static.

Preferably, the load of each of the cells within the active set is a function of the load of the respective $I_{uB}$ interface, or of the load of the respective baseband or of the load of both the respective $I_{uB}$ interface and the respective baseband.

In a particular embodiment, the step of comparing the load of said primary cell to the load of at least one of the remaining cells within the active set, comprises comparing the available IuB resources of said primary cell to the available IuB resources of said at least one of the remaining cells within the active set. That step of comparing the available IuB resources of said primary cell to the available IuB resources of said at least one of the remaining cells within the active set, is preferably done as follows: checking whether the available IuB resources of a cell of the active set, said cell not being the primary cell, and said cell belonging to a different NodeB than the primary cell, exceed the available IuB resources of said primary cell plus a predetermined factor; and if the available IuB resources of said cell exceed the available IuB resources of said primary cell plus a predetermined factor, transferring the downlink user plane from said primary cell to said cell of said remaining cells within the active set having best IuB conditions; if the available IuB resources of said cell does not exceed the available IuB resources of said primary cell plus a predetermined factor, repeating said checking with all or part of the remaining cells of said active set, said remaining cells belonging to a different NodeB than the primary cell, until either all the remaining cells are used or until the available IuB resources of a cell exceeds the available IuB resources of said primary cell plus a predetermined factor.

Preferably, the step of comparing the load of said primary cell to the load of at least one of the remaining cells within the active set, further comprises comparing the available baseband resources of said primary cell to the available baseband resources of at least one cell of the remaining cells within the active set.

In another particular embodiment, the step of comparing the load of said primary cell to the load of at least one of the remaining cells within the active set, comprises comparing the available baseband resources of said primary cell to the available baseband resources of said at least one of the remaining cells within the active set. That step of comparing the available baseband resources of said primary cell to the available baseband resources of said at least one of the remaining cells within the active set, is preferably done as follows: checking whether the available baseband resources of a cell of the active set, said cell not being the primary cell, and said cell belonging to a different NodeB than the primary cell, exceed the available baseband resources of said primary cell plus a predetermined factor; and if the available baseband resources of said cell exceed the available baseband resources of said primary cell plus a predetermined factor, transferring the downlink user plane from said primary cell to said cell of said remaining cells within the active set having best baseband conditions; if the available baseband resources of said cell does not exceed the available baseband resources of said primary cell plus a predetermined factor, repeating said checking with all or part of the remaining cells of said active set, said remaining cells belonging to a different NodeB than the primary cell, until either all the remaining cells are used or until the available baseband resources of a cell exceeds the available baseband resources of said primary cell plus a predetermined factor.

Preferably, the step of comparing the load of said primary cell to the load of at least one of the remaining cells within the active set, further comprises comparing the available IuB resources of said primary cell to the available IuB resources of at least one cell of the remaining cells within the active set.

Preferably, the call is an HSDPA call and the baseband resources of each of the cells are HSDPA codes.

In a further aspect of the present invention there is provided a network entity of a mobile communications network comprising means for carrying out the above-mentioned method. In particular, it comprises: means for determining whether the radio access bearer (RAB) of said call is being served on a soft handover area or not; means for determining whether the user of said mobile terminal can be considered static or in motion; comparing means for comparing the load of a primary cell to the loads of the remaining cells within the active set; and transferring means for transferring the downlink user plane from said primary cell to another cell, of said remaining cells within the active set.

That network entity can be either a RNC or an eNodeB (enhanced NodeB, 3GPP Rel'7).

Finally, the invention also refers to a computer program comprising computer program code means adapted to perform the steps of the above-mentioned method when said program is run on a computer, a digital signal processor, a field-programmable gate array, an application-specific integrated circuit, a micro-processor, a micro-controller, or any other form of programmable hardware.

The advantages of the proposed invention will become apparent in the description that follows.

BRIEF DESCRIPTION OF THE DRAWINGS

To complete the description and in order to provide for a better understanding of the invention, a set of drawings is provided. Said drawings form an integral part of the description and illustrate a preferred embodiment of the invention, which should not be interpreted as restricting the scope of the invention, but rather as an example of how the invention can be embodied. The drawings comprise the following figures:

FIG. 2 shows a flow diagram which represents an embodiment of the present invention.

DESCRIPTION OF PREFERRED EMBODIMENTS OF THE INVENTION

Figure 1:
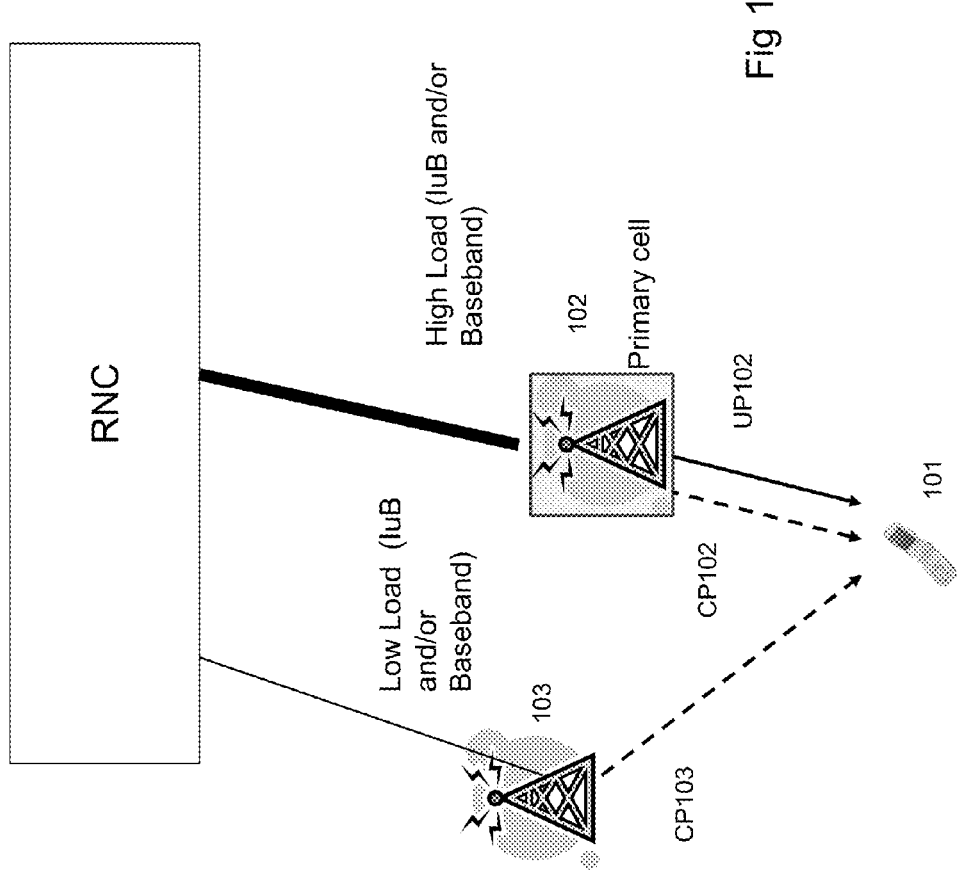
FIG. 1 shows a schematic representation of a possible scenario of soft handover in a cellular communications network.

In the context of the present invention, the expression "primary cell" identifies a cell that is received by the user equipment (UE) with the best radio conditions (that is to say, with the highest Ec/I0).

In the context of the present invention, the expression "active set" refers to a set of cells (radio links) simultaneously involved in a specific communication service between a user equipment (UE) and a UTRAN. The active set size is usually <=3, and in most implementations includes all the cells whose measured Ec/I0 is X dB (e.g. 3 dB) lower than the Ec/I0 of the primary cell provided that this Ec/Io is higher than a minimum threshold (e.g. −15 dB).

In the context of the present invention, the term "load" referred to a cell, means a generic function of both the IuB and Baseband load or only the IuB load or only the Baseband load.

In the context of the present invention, the term "call" refers to a packet-switched session over a radio bearer.

Besides, on a WCDMA system (either with or without HSDPA/HSUPA), the macro-diversity is called "soft handover".

In this text, the term "comprises" and its derivations (such as "comprising", etc.) should not be understood in an excluding sense, that is, these terms should not be interpreted as excluding the possibility that what is described and defined may include further elements, steps, etc.

The implementation of the present invention can be carried out as follows:

FIG. 1 shows a schematic representation of a possible scenario of soft handover in a cellular communications network and, more particularly, in HSDPA. In this particular example, a mobile terminal 101 is located within an area covered by two nodeBs 102 103. Both nodeBs are connected to a same RNC (Radio Network Controller) 104. As typical in Soft Handover situations, the downlink (DL) physical control plane is transmitted by both cells involved in the Soft Handover (DL control planes CP103 CP102) and combined in the mobile terminal 101, while the downlink (DL) user plane UP102 is transmitted only by the serving cell or primary cell (in this example, nodeB 102) towards the mobile terminal 101. As already explained, this primary cell or serving cell 102 is selected based on its best radio conditions, such as Ec/I0.

However, it often happens that the radio conditions, which determine the soft handover, are not balanced with the current available $I_{uB}$ and baseband resources. For example, FIG. 1 shows a situation in which the primary nodeB 102 has a highly loaded $I_{uB}$, while the non-serving nodeB 103 has free (or lowly loaded) $I_{uB}$. The same may happen in respect to the baseband resources.

The method and network entity (RNC) of the invention seeks to optimize resources of cellular communications networks, and specially of HSDPA, in situations of soft handover involving static users, by modifying the normal HSDPA behaviour in which the data is always transmitted by the primary cell. Such a mechanism has been designed in order to guarantee that the user is, in each location, always served by the cells having the best radio conditions; this has been designed in order to guarantee the best possible performances in mobility scenarios, where the usage of a cell different from the primary cell can cause the interruption of the data transmission.

However, when a user is on a static situation, its radio conditions are known, and there is the possibility to choose the serving cells based on criteria others than the pure radio conditions. Actually, the throughput received by a user depends on several factors apart from the radio conditions, such as the available hardware (HW) resources in the cell that is sending the data.

In particular, the DL user plane is transmitted from cells other than the primary cells if a set of conditions are met. In effect, the inventive method discards a cell belonging to a nodeB (which has previously been selected as primary nodeB 102 during a soft handover) and selects a cell belonging to a different nodeB 103, as serving cell. By doing so, the load is spread across neighbouring nodeBs over parts of the network that often become a bottleneck, i.e. the $I_{uB}$ and the baseband. Therefore, the network is able to serve with a higher throughput the users that are limited by the IuB and/or the baseband.

FIG. 2 shows a flow diagram which represents the algorithm according to an embodiment of the present invention. The algorithm to be followed is done at each RAB (Radio Access Bearer) set-up involving preferably HSDPA. It is to be noted that a RAB is established between the RNC 104 and the core network. The algorithm is explained next:

Once a packet switched (PS) session using HSDPA is established following a RAB set-up procedure (in which, in short, the Core Network sends to the RNC a RAB request, the RNC accepts the RAB request and decides to handle the packets over the HSDPA Bearer), the PS data are sent from the RNC to the UE 101 using the primary cell 102. This selection of the primary cell 102 is based on radio conditions and the primary cell 102 is chosen from the Active Set. This selection is beyond the scope of the present invention. This step is illustrated by reference 20 (FIG. 2).

Next, it is verified whether the RAB is being served on a Soft Handover area or not. This is verified by analysing the size of the active set and the number of nodeBs involved (box 21). If the active set is formed by a single cell (Active set size=1), transmission continues over that primary (and only) cell (box 26). If, on the contrary, the active set is formed by more than one cell, then it is checked whether those cells (at least two cells) belong to different nodeBs (at least two different nodeBs). If the two or more cells belong to the same nodeB, transmission continues over the primary cell belonging to that single nodeB (box 26). If, on the contrary, those at least two cells belong to at least two different nodeBs, then it is determined that the RAB is being served on a Soft Handover area.

Once determined that the RAB is being served on a Soft Handover area, it is verified whether the user is static or not (box 22). The verification can be done checking if, during a period of time T (seconds), the active set remains unchanged (the cells which form the active set do not change), T varying for example from 10 to 200 seconds. In this case, if the active set remains unchanged, the user can be considered static.

Alternatively, another check can be carried out in order to determine that the user is static: This check consists of checking whether the primary cell changes or not. In this case, if the primary cell does not change, the user can be considered static.

Preferably, both conditions are checked. This means that, in this case, if the active set remains unchanged and the primary cell does not change, then the user is considered static. If, on the contrary, at least one of those conditions is not fulfilled, then the user is considered in motion (non-static). If the user is not considered static, transmission continues over the primary cell (box 26).

Whenever the user is considered static, it is checked whether it is worth selecting a different cell of the Active Set to send the data through. This implies measuring and comparing the load (only IuB load, or only baseband load or both IuB & baseband load) of the cells of the Active Set. As explained above, a user not considered "static" is considered a user for which the radio conditions can change (and worsen) quickly, and in this scenario it is preferred to maintain the transmission to the user over the Primary Cell.

The IuB load is defined as the amount of Mbps (Megabits per second) carried over the IuB.

In particular: For the Primary Cell, the amount of the average IuB consumption (in Mbps) is calculated (preferably averaged over a period of T2 seconds) and compared with the available IuB resources. The free transmission resources are named "Free_IuB_Primary Cell". The same is done for all cells (i cells) of the Active Set that belong to a different NodeB, i.e. "Free IuB Cell i".

The condition of whether there is free IuB Load (box 23) is met if there is at least one cell other than the Primary cell meeting the following condition:

$$\text{Free } IuB \text{ Cell } i - \text{Free } IuB \text{ Primary Cell} >= \Delta \text{ Free } IuB$$

wherein "Δ Free IuB" is a parameter set by the operator and is expressed in Mbps.

This condition implies that it is calculated if any of the i cells belonging to the active set which besides belong to different NodeBs has more free (or available) IuB resources than the primary cell plus a certain threshold "Δ Free IuB". If the free IuB Load condition is not met by any of those cells, the call continues (box 26) over the Primary Cell.

Next, for all the i cells (1 to K) meeting this condition (the free IuB load condition) and for the Primary Cell, a condition related to the baseband load is evaluated (box 24).

The baseband load is defined as the amount of HSDPA codes used in a cell; in particular, the average number (within a certain period of time) of HSDPA codes used in a cell is evaluated.

The average number of HSDPA codes in the primary cell is calculated (preferably averaged over a period of the last T3 seconds) and compared to the maximum number of available HSDPA codes in that cell, resulting in a value called "Free HSDPA codes in Primary Cell". This value is not necessarily an integer, and preferably goes from 0.0 to 15.0).

The same is done for all cells (i cells) of the Active Set that belong to a different NodeB, and which have been selected in the previous step (box 23) because they fulfil the free IuB load condition. The evaluation of the "free HSDPA codes in Cell k" is thus accomplished.

The condition of whether there is free HSDPA codes load (box 24) is met if there is at least one cell in that reduced set of cells, other than the Primary cell, meeting the following condition:

Free *HSDPA* codes in Cell *k*−Free *HSDPA* codes in Primary Cell>=Δ Free *HSDPA* Codes wherein "Δ Free HSDPA Codes" is a parameter set by the operator.

This condition implies that it is calculated if any of the cells belonging to the active set which have been selected in step 23 has more free (or available) baseband resources (HSDPA codes) than the primary cell plus a certain threshold "Δ Free HADPA codes". If the Free HSDPA Codes Load condition is not met by any cell, the call continues (box 26) over the Primary Cell.

In a particular implementation, the evaluation of these two conditions stops once it is detected a cell within the active set (and belonging to a different nodeB) which fulfils the load condition or conditions. In an alternative implementation, the load of all the cells within the active set are checked and compared to that of the primary cell.

If both the Free IuB Load condition and the Free HSDPA codes condition are met on a number of cells (from 1 to L), the cell (in this set of maximum L cells) with the Best Radio Conditions ($E_C/I0$) is selected and the DL user plane is transferred from the current primary cell to the selected secondary cell.

This new cell is now responsible for sending the DL user plane to the mobile terminal (box 25).

Alternatively, the order of steps 23 and 24 (represented in boxes 23 and 24 in FIG. 2) can be exchanged. In other words, the "free baseband load condition" can be evaluated before the "free IuB load condition".

In an alternative embodiment, only one of the two load conditions is evaluated: either the "free baseband load condition" or the "free IuB load condition".

As far as Radio conditions are concerned, the cell with the best radio conditions remains the Primary Cell (i.e. the cell used as a reference in order to determine the cells that are part of the Active Set).

If during the communication the user leaves the static situation, its mobility can be revealed by one of the following events:

1) Across the Active Set, a cell different from the current Primary Cell is received with better radio conditions (Ec/I0)
2) A new cell enters the Active set (i.e. the measured Ec/I0 meets the criteria for being part of the Active Set; the criteria have been defined above in the document)
3) One of the cells belonging to the Active set leaves the Active set (i.e. measured Ec/I0 of this cell doesn't meet any longer the criteria to be part of the Active Set)
   If any of these events happen (box 27), the method for the static user is stopped, and the data transmission is switched to the Primary Cell (box 28) until the end of the call.

In conclusion, the invention enables to spread the load over $I_{uB}$ and baseband across neighbouring cells. As a consequence, a better and optimized use of the installed $I_{uB}$ and baseband resources is achieved.

The invention is obviously not limited to the specific embodiments described herein, but also encompasses any variations that may be considered by any person skilled in the art (for example, as regards the choice of components, configuration, etc.), within the general scope of the invention as defined in the appended claims.

The invention claimed is:

1. A method of selecting a cell from a certain active set of cells to become serving cell for a mobile terminal instead of the primary cell of said active set of cells during a call in a mobile communications network implementing soft handover, the method comprising the steps of:
   determining whether the radio access bearer (RAB) of said call is being served on a soft handover area or not, and:
   if said call is being served on a soft handover area, determining whether the user of said mobile terminal can be considered static or in motion, and:
   if said user of said mobile terminal is considered static, comparing the load of said primary cell to the load of at least one of the remaining cells within the active set, and:
   if the load of said primary cell exceeds the load of said at least one of said remaining cells within the active set by a predetermined
   factor, transferring the downlink user plane from said primary cell to said cell of said remaining cells within the active set, which is less loaded than said primary cell;
   wherein said step of determining whether the radio access bearer (RAB) of said call is being served on a soft handover area or not, is done as follows:
   counting the number of cells forming said active set;
   if said active set is formed by more than one cell, checking whether said cells forming the active set belong to at least two different nodeBs; and
   if said cells forming the active set belong to at least two different nodeBs, it is determined that the radio access bearer (RAB) of said call is being served on a soft handover area.

2. The method of claim 1, wherein:
   when determining whether the radio access bearer (RAB) of said call is being served on a soft handover area or not, if said call is not being served on a soft handover area, continuing transmission of said call over said primary cell;
   when determining whether the user of said mobile terminal can be considered static or in motion, if said user of said mobile terminal is considered in motion, continuing transmission of said call over said primary cell;
   and, when comparing the load of the primary cell to the loads of each of the remaining cells within the active set, if the load in said primary cell does not exceed the load in at least one of said remaining cells within the active set by a predetermined factor, continuing transmission of said call over said primary cell.

3. The method of claim 1, wherein, when checking whether said cells forming the active set belong to at least two different nodeBs, if said cells forming the active set belong to a same nodeB, continuing transmission of said call over said primary cell belonging to that nodeB.

4. The method of claim 1, wherein said step of determining whether the user of said mobile terminal can be considered static or in motion, is done as follows:
checking whether the cells forming the active set are the same for a certain period of time; and
if the cells forming the active set vary during said period of time, the user of said mobile terminal is considered in motion;
if the cells forming the active set are the same for said period of time, the user of said mobile terminal is considered static.

5. The method of claim 1, wherein said step of determining whether the user of said mobile terminal can be considered static or in motion, is done as follows:
checking whether the cell acting as primary cell does not change for a certain period of time; and
if the cell acting as primary cell changes during said period of time, the user of said mobile terminal is considered in motion;
if the cell acting as primary cell does not change during said period of time, the user of said mobile terminal is considered static.

6. The method of claim 1, wherein said step of determining whether the user of said mobile terminal can be considered static or in motion, is done as follows:
checking whether the cells forming the active set do not change over a certain period of time; and
if the cells forming the active set vary at some point in time during the call, the user of said mobile terminal is considered in motion;
if the cells forming the active set are the same for said period of time, checking whether the cell acting as primary cell does not change; and
if the cell acting as primary cell changes at some point in time during the call, the user of said mobile terminal is considered in motion;
if the cell acting as primary cell does not change at some point in time during the call, the user of said mobile terminal is considered static.

7. The method of claim 1, wherein the load of each of the cells within the active set is a function of the load of the respective $I_{uB}$ interface, or of the load of the respective baseband or of the load of both the respective $I_{uB}$ interface and the respective baseband.

8. The method of claim 1, wherein said step of comparing the load of said primary cell to the load of at least one of the remaining cells within the active set, comprises comparing the available IuB resources of said primary cell to the available IuB resources of said at least one of the remaining cells within the active set.

9. The method of claim 8, wherein said step of comparing the available IuB resources of said primary cell to the available IuB resources of said at least one of the remaining cells within the active set, is done as follows:
checking whether the available IuB resources of a cell of the active set, said cell not being the primary cell, and said cell belonging to a different NodeB than the primary cell, exceed the available IuB resources of said primary cell plus a predetermined factor; and
if the available IuB resources of said cell exceed the available IuB resources of said primary cell plus a predetermined factor, transferring the downlink user plane from said primary cell to said cell of said remaining cells within the active set having best IuB conditions;
if the available IuB resources of said cell does not exceed the available IuB resources of said primary cell plus a predetermined factor, repeating said checking with all or part of the remaining cells of said active set, said remaining cells belonging to a different NodeB than the primary cell, until either all the remaining cells are used or until the available IuB resources of a cell exceeds the available IuB resources of said primary cell plus a predetermined factor.

10. The method of claim 1, wherein said step of comparing the load of said primary cell to the load of at least one of the remaining cells within the active set, comprises comparing the available baseband resources of said primary cell to the available baseband resources of said at least one of the remaining cells within the active set.

11. The method of claim 10, wherein said step of comparing the available baseband resources of said primary cell to the available baseband resources of said at least one of the remaining cells within the active set, is done as follows:
checking whether the available baseband resources of a cell of the active set, said cell not being the primary cell, and said cell belonging to a different NodeB than the primary cell, exceed the available baseband resources of said primary cell plus a predetermined factor; and
if the available baseband resources of said cell exceed the available baseband resources of said primary cell plus a predetermined factor, transferring the downlink user plane from said primary cell to said cell of said remaining cells within the active set having best baseband conditions;
if the available baseband resources of said cell does not exceed the available baseband resources of said primary cell plus a predetermined factor, repeating said checking with all or part of the remaining cells of said active set, said remaining cells belonging to a different NodeB than the primary cell, until either all the remaining cells are used or until the available baseband resources of a cell exceeds the available baseband resources of said primary cell plus a predetermined factor.

12. The method of claim 9, wherein said step of comparing the load of said primary cell to the load of at least one of the remaining cells within the active set, further comprises comparing the available baseband resources of said primary cell to the available baseband resources of at least one cell of the remaining cells within the active set.

13. The method of claim 11, wherein said step of comparing the load of said primary cell to the load of at least one of the remaining cells within the active set, further comprises comparing the available IuB resources of said primary cell to the available IuB resources of at least one cell of the remaining cells within the active set.

14. The method of claim 1, wherein said call is an HSDPA call and wherein the baseband resources of each of the cells are HSDPA codes.

15. A network entity of a mobile communications network configured for carrying out the method of claim 1, said network entity comprising:
means for determining whether the radio access bearer (RAB) of said call is being served on a soft handover area or not;
means for determining whether the user of said mobile terminal can be considered static or in motion;

comparing means for comparing the load of a primary cell to the loads of the remaining cells within the active set; and transferring means for transferring the downlink user plane from said primary cell to another cell, of said remaining cells within the active set.

16. A non-transitory computer program product comprising computer program code means adapted to perform the steps of the method according to claim 1 when said program is run on a device selected from the following: a computer, a digital signal processor, a field-programmable gate array, an application-specific integrated circuit, a micro-processor, a micro-controller, or any other form of programmable hardware.

* * * * *